United States Patent [19]

Hisler

[11] Patent Number: 5,361,611
[45] Date of Patent: Nov. 8, 1994

[54] LOCKING DEVICE FOR A ROD AND REEL

[76] Inventor: Charles J. Hisler, 4100 Woodland Ave., Drexel Hill, Pa. 19026

[21] Appl. No.: 45,137

[22] Filed: Apr. 12, 1993

[51] Int. Cl.$^5$ .................... A01K 87/06; E05B 73/00
[52] U.S. Cl. ........................................ 70/18; 43/25;
70/58; 70/61; 70/62; 211/4; 224/922; 242/323; 248/552
[58] Field of Search .................. 70/18, 19, 57–59, 70/61, 62; 248/551, 552, 553; 43/25; 242/106; 224/922; D. 22/147; 211/4, 70.8

[56] References Cited

U.S. PATENT DOCUMENTS

| | | | |
|---|---|---|---|
| D. 221,417 | 8/1971 | Prichard | D8/113 |
| 284,165 | 9/1883 | Bean | 70/17 |
| 371,255 | 10/1887 | Drinker et al. | 70/18 |
| 1,377,124 | 5/1921 | Godbey, Jr. | 70/18 |
| 1,395,906 | 11/1921 | Clayton | 70/18 |
| 1,713,230 | 5/1929 | Hunt | 70/61 |
| 1,816,334 | 7/1931 | Matthews . | |
| 2,788,928 | 4/1957 | Des Fosses | 248/553 X |
| 3,876,076 | 4/1975 | Hazelhurst | 211/4 |
| 3,954,252 | 5/1976 | Lyons | 70/61 X |
| 3,958,694 | 5/1976 | Pritz | 248/553 X |
| 3,959,995 | 6/1976 | Fletcher | 70/18 |
| 3,985,275 | 10/1976 | Allen | 70/58 X |
| 4,027,798 | 6/1977 | Swaim | 248/552 X |
| 4,057,983 | 11/1977 | Morgan | 70/18 |
| 4,063,646 | 12/1977 | Stahl, Jr. | 248/552 X |
| 4,296,615 | 10/1981 | Zoor | 70/19 |
| 4,335,840 | 6/1982 | Williams | 224/922 X |
| 4,506,528 | 3/1985 | Eberly | 70/18 |
| 4,572,416 | 2/1986 | Upham | 224/922 X |
| 4,802,612 | 2/1989 | Anderson | 224/922 X |
| 4,881,386 | 11/1989 | Glines | 70/19 |
| 4,955,215 | 9/1990 | Eremita | 70/18 |
| 5,070,712 | 12/1991 | Fox | 70/18 |

FOREIGN PATENT DOCUMENTS

| | | | |
|---|---|---|---|
| 1037063 | 9/1953 | France | D22/ |
| 2643409 | 8/1990 | France | 70/58 |
| 3202699 | 8/1983 | Germany | 70/57 |

*Primary Examiner*—Lloyd A. Gall
*Attorney, Agent, or Firm*—Eric LaMorte

[57] ABSTRACT

A locking device used to secure a fishing rod and reel assembly to another object, such as an automobile, boat or the like. The locking device includes a hasp that closes around a fishing rod and the elongated neck of a fishing reel that extends from the fishing rod. The hasp includes apertures that can accept a padlock, wherein the padlock prevents the hasp from being removed from around the fishing rod and reel assembly. When closed around the fishing rod and reel assembly, the hasp independently engages both the fishing rod and the fishing reel. The hasp is mechanically attached to an object such as an automobile or boat, as such the hasp joins the fishing rod and reel assembly to the object, preventing the casual theft of the rod and reel assembly.

13 Claims, 4 Drawing Sheets

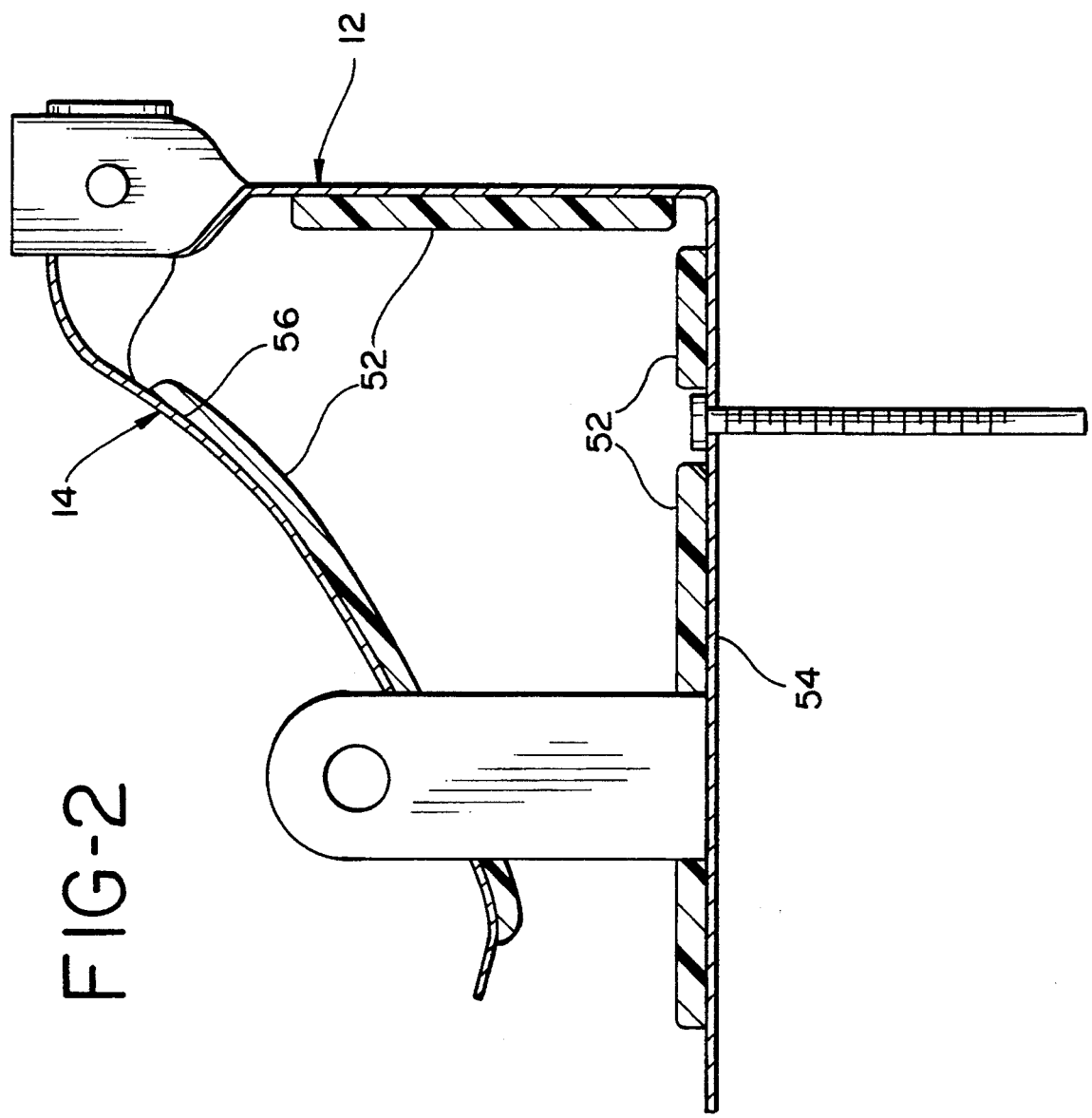

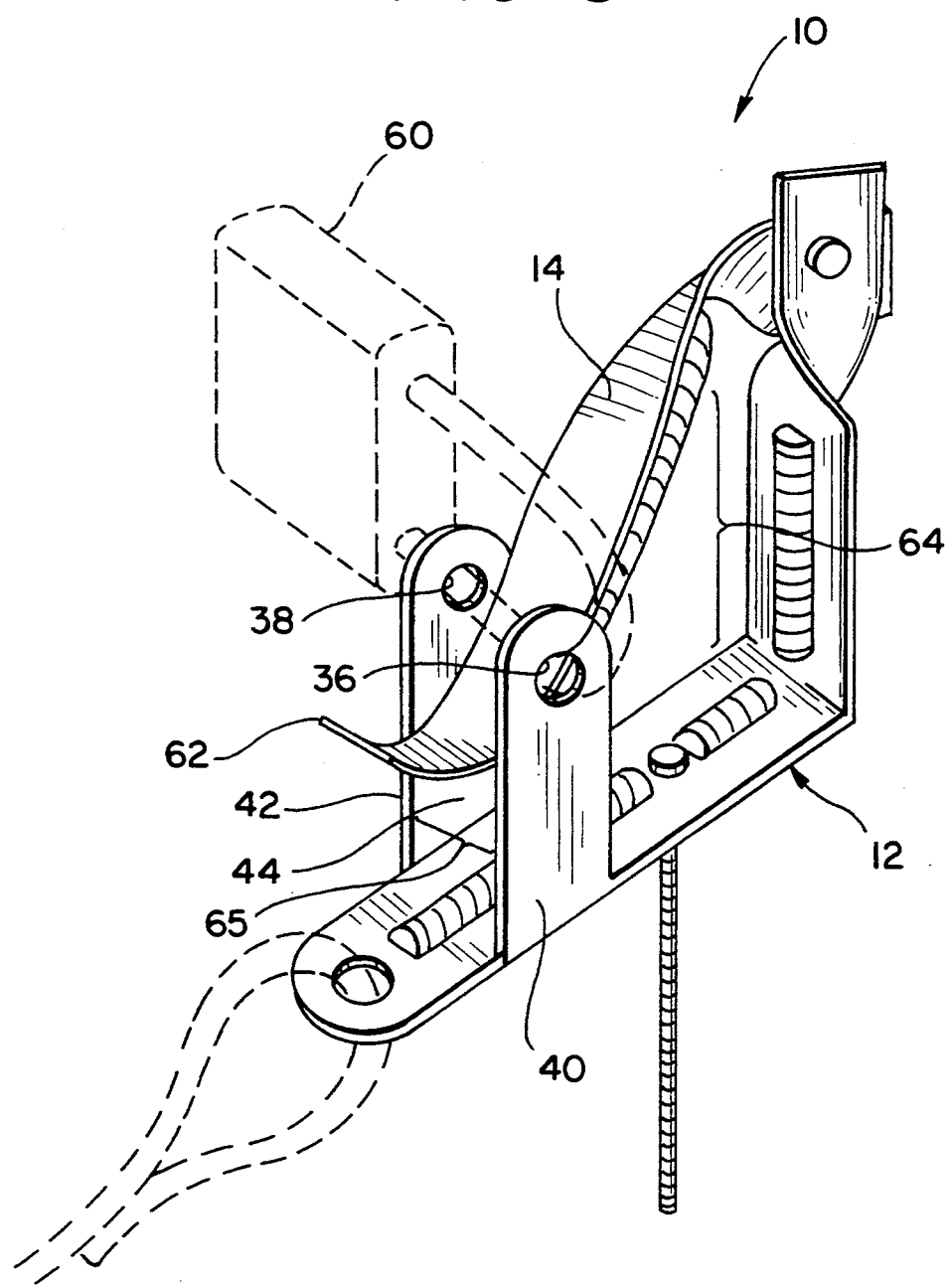

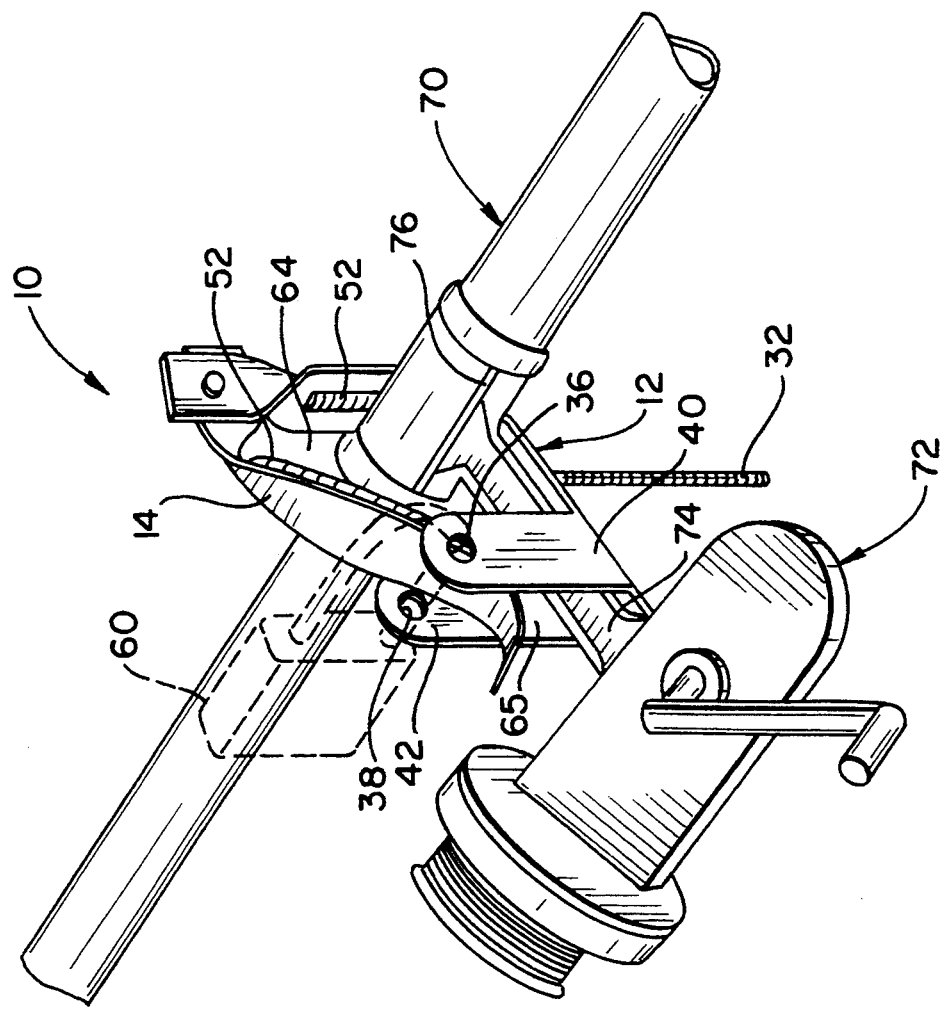

LOCKING DEVICE FOR A ROD AND REEL

BACKGROUND OF THE INVENTION

1. Field of the Invention

The present invention is a locking shackle used in combination with a padlock to both secure a fishing pole to a stationary object and to secure a fishing reel onto the fishing pole, thereby preventing the casual theft of either the rod or the reel.

2. Description of the Prior Art

Fishing reels are conventionally designed to be independent mechanisms that are selectively attachable to fishing rods. This enables a single fishing reel to be used on a large variety of fishing rods. As a result, fishing reels are often carried separately from the fishing rods when the rods and reels are packed and transported. However, in many situations, such as a short drive to a local fishing hole, it is desirable to preassemble the fishing reel onto a preferred fishing rod and place a desired tackle onto the fishing line. In this manner, the rod and reel are ready for fishing when the fisherman arrives at the fishing hole and little time is wasted in readying the rod and reel for use. Similarly, for avid fishermen who fish often, it is a large inconvenience to remove tackle from the fishing line and disassemble the fishing reel from the rod each time the rod and reel are transported.

Both fishing rods and fishing reels have become increasingly expensive as the sophistication in the designs and materials used in the rods and reels have advanced. Since fishing rods and fishing reels have become so expensive, a fisherman will usually only leave a fishing reel on a rod if the rod and reel can be stored or transported safely together in their assembled state. For instance, if a fisherman has a large enough vehicle to transport his or her rod and reel preassembled within the vehicle, then there is no need to disassemble the rod and reel during transportation. However, many fishing rods, such as those used in deep sea fishing are very large. Consequently, very few fishermen are capable of transporting an assembled rod and reel within their vehicles. As a result, if the assembled rod and reel are to be transported, the rod and reel assembly must be carried on the outside of their vehicles on a roof rack or like arrangement. As such, both the rod and reel become more vulnerable to theft.

Rods and reels are also vulnerable to theft when the fisherman leaves the rod and reel assembly unattended at the fishing location. For instance, when fishermen go to a tackle shop, go to lunch, or otherwise use a commercial establishment, they typically do not disassemble and store their rods and reels. Rather, they often leave the rod and reel assembly unattended outside the commercial establishment. Consequently, many times fishermen return to find their rods and/or reels stolen.

The prior art is replete with devices that are used to secure portable objects to stationary structures, thereby deterring the theft of those portable objects. Many such prior art devices are specifically designed to retain elongated rod-shaped objects, however, the prior art fails to show a device that can be properly adapted to secure a rod and reel as an assembly. For example, in U.S. Pat. No. 4,296,615 to Zoor, entitled ANTI-THEFT ARRANGEMENT PARTICULARLY FOR A MAST OF A SAILING CRAFT, a locking shackle is disclosed for rod-shaped objects. The locking shackle may be adapted to engage a fishing rod, however, the shackle provides no protection to a fishing reel that may be attached to the rod. Similarly, in U.S. Pat. No. 1,816,334 to Matthews, entitled OAR AND PADDLE HOLDER AND LOCK and U.S. Pat. No. 4,057,983 to Morgan, entitled LOCK FOR SKIS, there are shown locking shackles that can be adapted to retain a fishing rod alone. However, neither has a functional shape that can be used to retain both a fishing rod and a fishing reel attached to the fishing rod.

U.S. Pat. No. 284,165 to Bean, entitled POLICEMAN'S HOOK; U.S. Pat. No. 1,377,124 to Godbey, entitled LOCK FOR AUTOMOBILES; and U.S. Pat. No. 371,255 to Drinker, entitled SEAL LOCK all show locking shackles that include a hinged joint and are formed to lock an elongated object. However, none of the shackles are designed to also retain an object on the elongated object that they engage.

U.S. Pat. No. 5,070,712 to Fox, entitled LOCKING DEVICE, shows a locking shackle used in conjunction with a padlock. The locking shackle is used to retain the end of a length of flexible cable, thereby allowing any plurality of articles bound by the flexible cable to be locked together.

The prior art fails to show a locking shackle that has been designed to retain both a rod-shaped object and also retain a secondary object, such as a fishing reel, onto the rod-shaped object. As such, if any of the prior art locking shackles were applied to a fishing rod and reel assembly, those prior art devices would be able to secure the fishing rod, but would leave the fishing reel unprotected. Since fishing reels are designed to be removably attachable to fishing rods, the fishing reels could be easily removed from the fishing rods and stolen. In view of the prior art, there exists a need for a locking shackle that can engage both a fishing rod and a fishing reel, thereby preventing the theft of the fishing rod and reel or of either component separately.

It is therefore an object of the present invention to provide a locking shackle that is specifically designed for use with a fishing rod and reel assembly, wherein the locking shackle secures the fishing rod to a stationary object and secures the fishing reel to the rod, thereby preventing the theft of both.

It is a further object of the present invention to provide a locking shackle that will secure both a rod and reel in a manner that will not damage the materials or the finish on either the rod or the reel.

SUMMARY OF THE INVENTION

The present invention is a locking device used to secure a fishing rod and reel assembly to another object, such as an automobile, boat or the like. The locking device includes a hasp that closes around a fishing rod and the elongated neck of a fishing reel that extends from the fishing rod. The hasp includes apertures that can accept a padlock, wherein the padlock prevents the hasp from being removed from around the fishing rod and reel assembly. When closed around the fishing rod and reel assembly, the hasp independently engages both the fishing rod and the fishing reel. The hasp is mechanically attached to an object such as an automobile or boat, as such the hasp joins the fishing rod and reel assembly to the object, preventing the casual theft of the rod and reel assembly.

As the hasp engages the fishing rod and reel, the hasp prevents the fishing reel from being removed from the rod. Consequently, the hasp prevents the theft of the reel from the rod as well as the theft of the entire rod and reel assembly.

The surfaces of the hasp that engage the fishing rod and reel are padded. As such, when the hasp is closed over the fishing rod and reel assembly, the finish on the rod and reel are not damaged. Furthermore, as the hasp is closed, the padding is biased against the fishing rod and reel. The engagement of the padding with the fishing rod and reel prevents the rod and reel from moving within the hasp. Consequently, the fishing rod and reel can be transported while within the hasp without damage,

BRIEF DESCRIPTION OF THE DRAWINGS

For a better understanding of the present invention locking device, reference is made to the following description of an exemplary embodiment thereof, considered in conjunction with the accompanying drawings, in which:

FIG. 2 is a cross-sectional view of the embodiment of FIG. 1, viewed along section line 2—2;

FIG. 3 is a perspective view of the present invention locking device shown in conjunction with a padlock, wherein the locking arm is shown in a closed, locked position; and FIG. 4 is a perspective view of the present invention locking device shown in conjunction with a fishing rod and reel to illustrate the function of the present invention.

DETAILED DESCRIPTION OF THE INVENTION

Figure 1:
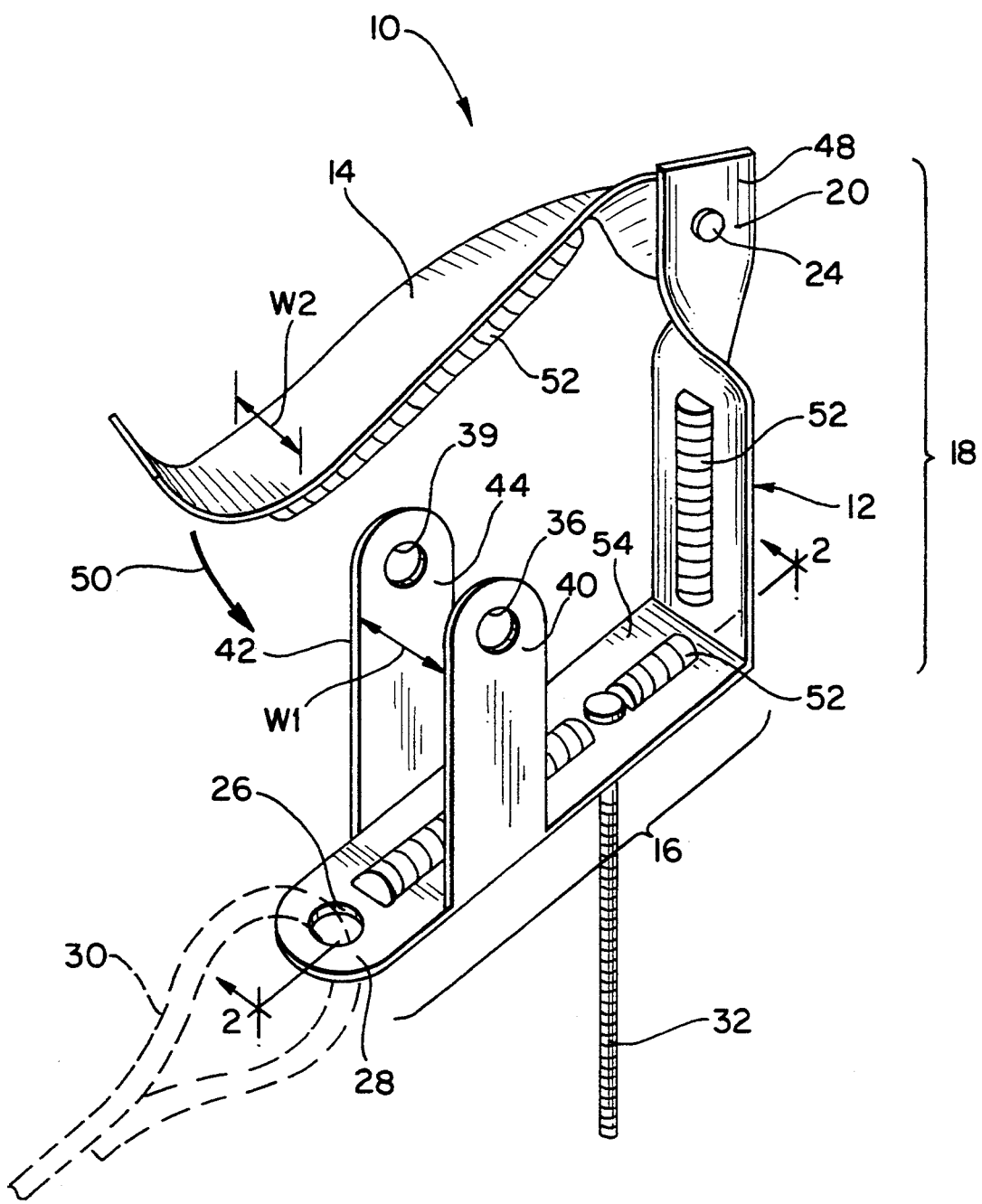
FIG. 1 is a perspective view of one preferred embodiment of the present invention locking device, wherein the locking arm is shown in an open position to facilitate discussion and consideration.

Referring to FIG. 1, a first exemplary embodiment of the present invention locking device 10 is shown consisting primarily of a hasp body 12 connected to a locking arm 14 at a pivot connection. In the shown embodiment, the hasp body 12 is made of an elongated piece of metal bent approximately at a ninety degree angle so as to give the hasp body 12 a generally L-shaped configuration. As such, in the perspective shown, the hasp body 12 has a first region 16 that generally extends in the horizontal plane and a second region 18 that generally extends at a normal to the first region 16 in the vertical plane. The distal end 20 of the second region 18 is twisted ninety degrees from the plane of the remainder of the second region 18 in order to facilitate the interconnection of the distal end 20 of the second region 18 to the locking arm 14. An aperture is formed through the distal end 20 of the second region 18 to facilitate the acceptance of a pivot pin 24.

A second aperture 26 is formed through the proximal end 28 of the second region 18 of the hasp body 12. An optional steel cable or other flexible securing means 30, such as a chain or the like, can be positioned through the second aperture 26, thereby securing the hasp body 12 to another object via the flexible securing means 30. Similarly, a mechanical fastener 32, such as a screw, bolt or the like, may extend from the hasp body 12. The mechanical fastener 32 can optionally be used to secure the hasp body 12 to another object such as an automobile, fishing boat or the like.

Two arm members 40, 42 extend at a perpendicular from the second region 18 of the hasp body 12. The interstice 44 between the two arm members 40, 42 has a width W1, which is preferably the same width as the piece of metal forming the hasp body 12. In the shown embodiment, the two arm members 40, 42 are unistructurally formed as part of the hasp body 12, wherein both arm members 40, 42 are bent at a perpendicular to the plane of the first region 16. As such, it should be understood that the entire hasp body 12 can be made from a single blank of metal wherein the vertical second region 18 and the two arm members 40, 42 are formed by selectively bending the blank. Two locking apertures 36, 38 are formed near the top of the two arm members 40, 42. As will be later described, the two locking apertures 36, 38 are adapted to receive a padlock.

Although the two arm members 40, 42 are preferably unistructurally formed as part of the hasp body 12, it will be understood that the two arm members 40, 42 can be separately attached to the hasp body 12. For example, each of the arm members 40, 42 can be individually welded onto the hasp body 12, or a U-shaped member can be attached to the hasp body 12 wherein the U-shaped member creates the two arm members 40, 42.

In the shown embodiment, the locking arm 14 is also made of a single piece of metal that has been selectively bent and twisted into the desired shape shown. An aperture 48 is formed through the locking arm 14 at one end. The aperture in the locking arm 14 aligns with the aperture in the distal end 20 of the hasp body 12. The pivot pin 24 passes through the apertures in both the locking arm 14 and the hasp body 12, thereby pivotably connecting the locking arm 14 to the hasp body 12. The pivot pin 24 can be any mechanical device, such as a rivet that pivotably connects the locking arm 14 to the hasp body 12 yet cannot be easily removed by a thief.

The width W2 of the locking arm 14 is slightly less than the width W1 of the interstice 44 in between the two arm members 40, 42 on the hasp body 12. Furthermore, the locking arm 14 is formed so that the locking arm 14 passes in between the two arm members 40, 42 of the hasp body 12 as the locking arm 14 pivotably rotates around the pivot pin 24 in the direction of arrow 50.

Referring to FIG. 2 in conjunction with FIG. 1, it can be seen that a padding material 52 is disposed on the top surface 54 of the hasp body 12 as well as on the lower surface 56 of the locking arm 14. The padding material 52 can be any synthetic or natural material suitable for outdoor use. For example, the padding material 52 can be a strip of preformed elastomeric material adhesively attached to the hasp body 12 and locking arm 14. Similarly, the padding material 52 can be a bead of silicon sealant applied and cured directly onto the hasp body 12 and locking arm 14. As will later be explained, the padding material 52 will engage the fishing reel and rod. The present invention is designed to secure, thereby preventing the locking arm 14 and/or the hasp body 12 from damaging the finish on either the rod or the reel.

Referring now to FIG. 3, the present invention locking device 10 is shown in a closed position, locked with a conventional padlock 60. As can be seen, the padlock 60 extends through the locking apertures 36, 38 on the two arm members 40, 42 that extend upwardly from the hasp body 12. Before the padlock 60 is placed through the locking apertures 36, 38, the locking arm 14 is pivotably rotated so that the proximal end 62 of the locking arm 14 extends through the interstice 44 between the two arm members 40, 42 at a point below the plane of the locking apertures 36, 38. As the padlock 60 is locked through the locking apertures 36, 38, the padlock 60 obstructs the space between the arm members 40, 42 and prevents the locking arm 14 from pivotably rotating out from between the two arm members 40, 42.

When the locking arm 14 is locked between the arm members 40, 42 by the padlock 60, the locking arm 14 does not lay flat against the hasp body 12. Rather, a large first open region 64 is formed between the locking arm 14 and the hasp body 12. Similarly there exists a second open region 65 that communicates with the first open region 64, in between the locking arm 14 and the hasp body 12 and in between the two arm members 40, 42.

In FIG. 4, the present invention locking device 10 is shown in conjunction with a fishing rod 70 and a fishing reel 72. The fishing reel 72 includes an elongated neck 74 that terminates in a flanged end 76. The flanged end 76 is connected to the fishing rod 70 utilizing any known prior art interconnection mechanism.

When placing the assembled fishing rod 70 and reel 72 into the locking device 10, the padlock 60 is removed and the locking arm 14 is pivotably rotated into an open position, such as was illustrated in FIG. 1. The fishing rod 70 is then placed across the hasp body 12 so that the elongated neck 74 of the fishing reel 70 extends along the hasp body 12 and passes through the two arm members 40, 42. The locking arm 14 is then pivotably rotated into the closed position shown in FIG. 3, and the padlock 60 is placed through the lock apertures 36, 38 on the arm members 40, 42. As such, the connection between the fishing rod 70 and reel 72 passes through the first open region 64 between the locking arm 14 and the hasp body 12 and the elongated neck 74 of the reel 72 passes through the second open region 65 between the locking arm 14 and the hasp body 12 and in between the two arm members 40, 42.

The flanged end 76 at the end of the elongated neck 74 of the fishing reel 72 is too wide to fit within the second open region 65. As such, the present invention locking device 10, in conjunction with the padlock 60, have engaged the fishing reel 72 in a manner that prevents the fishing reel 72 from being removed from the locking device 10. Similarly, the presence of the fishing rod 70 between the locking arm 14 and the hasp body 12 prevents the fishing rod 70 from being removed from the locking device 10 when closed. Consequently, the present invention locking device 10 secures both a fishing rod 70 and a fishing reel 72 preventing either or both from being removed from the locking device 10.

As the present invention locking device 10 is secured around a fishing rod and reel 70, 72, the padding material 52 is biased against the structure of the rod and reel and prevents the rod and reel from touching the metal parts of the locking arm 14 and hasp body 12. As such, the padding material 52 protects the finish of the rod and reel. The engagement of the padding material 52 against the rod and reel also prevents the vibrational movement of the rod and reel within the locking device 10. This further serves to protect the finish of the rod and reel if the rod and reel are transported while retained within the locking device 10.

The locking device 10 is attached to an object such as an automobile, boat, cabin or the like, utilizing either the mechanical fastener 32 that extends from the hasp body 12 or the flexible securing means 30 (shown in FIG. 1) that is joined to the hasp body 12. As such, the locking device 10 selectively couples a fishing rod and reel to another object preventing the theft of the fishing rod and/or reel.

Although the described embodiment of the present invention locking device is believed to represent the best mode of the present invention, it should be understood that many described elements of the present invention have known functional equivalents. Additionally, the shapes of the locking arm and hasp body as well as proportions, materials and orientations used in the exemplary embodiment can be modified by a person skilled in the art without changing the function of the present invention. All such modifications and variations are intended to be covered by the scope of the present invention as set forth in the appended claims.

What is claimed is:

1. A locking device for securing a fishing rod and reel assembly, wherein the fishing reel includes an elongated neck that connects the fishing reel to the fishing rod, said device comprising:

a hasp having a base structure and a locking arm pivotably attached to said base structure, wherein said locking arm can be pivotably rotated between an open position and a closed position, said hasp engaging the fishing rod and the elongated neck of the fishing reel at said closed position in a manner that prevents the fishing reel and the fishing rod from being removed from said hasp;

padding means for padding said hasp where said hasp engages said fishing rod and said fishing reel; and securing means for securing said hasp to an object, wherein said hasp and said securing means cooperate to prevent the unauthorized removal of said fishing rod and said fishing reel from said object.

2. The device according to claim 1, further including a locking means for selectively locking said hasp in said closed position, thereby selectively preventing said locking arm from moving from said closed position to said open position.

3. The device according to claim 2, wherein said locking means includes a means for receiving a padlock, wherein said padlock prevents said hasp from being opened from said closed position when engaged within said receiving means.

4. The device according to claim 1, wherein said securing means includes at least one mechanical fastener for mechanically joining said hasp to said object.

5. The device according to claim 1, wherein said securing means includes a flexible cable that mechanically couples said hasp to said object.

6. The device according to claim 1, wherein said base structure includes a substantially U-shaped formation through which the elongated neck of the fishing reel passes and said locking arm obstructs said U-shaped formation when at said closed position, thereby preventing the removal of the fishing reel from said U-shaped formation.

7. A device for preventing the theft of a fishing reel from a fishing rod and reel assembly, wherein the fishing reel has an elongated neck that is attached to a fishing rod, said device comprising:

a base member having a structure thereon that partially surrounds and engages the elongated neck of the fishing reel and a portion of the fishing rod when the rod and reel assembly is set in a predetermined orientation in respect to the base member;

a locking arm member pivotably coupled to said base member, said locking arm member being pivotably rotatable to a closed position wherein said base member and said locking arm member cooperate to substantially encircle the elongated neck of the fishing reel and the portion of the fishing rod, thereby preventing said fishing reel from being removed from said fishing rod;

means for receiving a padlock, wherein said padlock prevents said locking arm member from being opened from said closed position by coupling said locking arm member to said base member, 8. The device according to claim 7, further including a means for padding said base member and said locking arm member where said base member and said locking arm member substantially encircle said fishing rod and said fishing reel, thereby preventing said base member and said locking arm member from damaging the rod and reel assembly.

9. The device according to claim 7, further including a means for connecting said base member to a predetermined object, thereby selectively securing the rod and reel assembly to the predetermined object.

10. The device according to claim 7 wherein said base member includes a substantially U-shaped formation through which the elongated neck of the fishing reel passes and said locking arm member obstructs said U-shaped formation when at said closed position, thereby preventing the removal of the fishing reel from said U-shaped formation.

11. A device for securing a rod and reel assembly to another object, wherein the rod and reel assembly includes a fishing reel removably affixed to a fishing rod, said device comprising:

a hasp having a locking arm that can be pivotably moved about a pivot point on said hasp from an open position to a closed position, wherein said hasp engages said rod and said reel of said rod and reel assembly in a manner that prevents the removal of either the rod or the reel from said hasp when said locking arm is in said closed position;

means for receiving a padlock, wherein said padlock prevents said hasp from being opened from said closed position by locking said locking arm into a set position relative to said hasp and preventing the rotation of said locking arm about said pivot point; and securing means for securing said hasp to the object, wherein said hasp and said securing means cooperate to prevent the unauthorized removal of said fishing rod and said fishing reel from said object.

12. The device according to claim 11, further including padding means for padding said hasp where said hasp engages said fishing rod and said fishing reel.

13. The device according to claim 11, wherein said hasp includes a substantially U-shaped formation through which the fishing reel passes and said locking arm obstructs said U-shaped formation when at said closed position, thereby preventing the removal of the fishing reel from said U-shaped formation.

* * * * *